United States Patent [19]

Allaire

[11] Patent Number: 4,776,865
[45] Date of Patent: Oct. 11, 1988

[54] METHOD OF FORMING A FIBER-REINFORCED INORGANIC COMPOSITE

[75] Inventor: Roger A. Allaire, Big Flats, N.Y.
[73] Assignee: Corning Glass Works, Corning, N.Y.
[21] Appl. No.: 942,282
[22] Filed: Dec. 16, 1986
[51] Int. Cl.$^4$ .................. C03C 25/02; B29D 28/00
[52] U.S. Cl. ............................ 65/3.2; 65/4.1; 156/180; 264/103; 264/137; 264/231; 427/376.2; 427/434.2; 427/443.2
[58] Field of Search ............... 264/103, 231, DIG. 75, 264/81, 29.2, 60, 62, 125, 131, 134, 136, 137, 210.3, 210.4, 235, 239, 257, 258, 260, 288.4, DIG. 19; 156/160, 161, 163, 166, 180; 65/3.2, 4.1, 4.3, 12, 60.1; 427/176, 343, 344, 375, 397.7, 376.2, 434.2, 443.2

[56] References Cited

U.S. PATENT DOCUMENTS

| | | | |
|---|---|---|---|
| 2,859,482 | 11/1958 | Warren et al. | 264/134 |
| 2,953,849 | 9/1960 | Morgan | 264/DIG. 19 |
| 2,956,039 | 10/1960 | Novak et al. | 264/DIG. 19 |
| 3,501,048 | 3/1970 | Strickland et al. | 264/60 |
| 3,653,863 | 4/1972 | Araujo et al. | 65/30 |
| 3,655,352 | 4/1972 | Elliot | 65/4.3 |
| 3,702,240 | 11/1972 | Siefert | 65/4.1 |
| 3,742,101 | 6/1973 | Ouchi et al. | 264/DIG. 19 |
| 4,020,896 | 5/1977 | Mold et al. | 65/4.1 |
| 4,154,591 | 5/1979 | French et al. | 65/3.2 |
| 4,202,660 | 5/1980 | Pei | 65/4.1 |
| 4,282,022 | 8/1981 | Lo et al. | 65/85 |
| 4,296,060 | 10/1981 | Killmeyer et al. | 264/137 |
| 4,304,584 | 12/1981 | Borrelli et al. | 65/30.11 |
| 4,318,762 | 3/1982 | Meyer | 264/137 |
| 4,352,769 | 10/1982 | Meyer | 264/137 |
| 4,485,179 | 11/1984 | Brennan et al. | 501/32 |
| 4,511,663 | 4/1985 | Taylor | 501/4 |
| 4,517,039 | 5/1985 | Satzler | 264/103 |
| 4,549,920 | 10/1985 | Cogswell et al. | 156/181 |
| 4,581,053 | 4/1986 | Prewo et al. | 65/4.21 |
| 4,588,699 | 5/1986 | Brennan et al. | 501/9 |
| 4,589,900 | 5/1986 | Brennan et al. | 65/33 |
| 4,613,473 | 9/1986 | Layden et al. | 264/103 |

FOREIGN PATENT DOCUMENTS

| | | | |
|---|---|---|---|
| 53-38353 | 10/1978 | Japan | 264/103 |
| 58-31568 | 7/1983 | Japan | 65/4.1 |

Primary Examiner—Jay H. Woo
Assistant Examiner—C. Scott Bushey
Attorney, Agent, or Firm—Clinton S. Janes, Jr.

[57] ABSTRACT

A method of forming a fiber-reinforced, glass or glass-ceramic, elongated composite is described wherein several multifiber lengths are impregnated with matrix material, woven or twisted to form a fabric network, the impregnating matrix material softened, and the network subjected to a stretching action along the central axis of the fiber network to collapse the network and consolidate it to a solid composite.

12 Claims, 2 Drawing Sheets

METHOD OF FORMING A FIBER-REINFORCED INORGANIC COMPOSITE

RELATED APPLICATION

A companion application, Ser. No. 942,281, pending entitled "Pultrusion Process for Fiber-Reinforced Composites" is being filed of even date herewith. That application (Allaire et al.) discloses and claims a method of producing an elongated, fiber-reinforced composite having a glass or glass-ceramic matrix and a uniform cross-section along one axis. The method comprises impregnating a tow or other continuous bundle of fibers with glass. Several impregnated fiber bundles are gathered and pultruded through a consolidating die, thus subjecting the impregnated fiber bundles to a combination of forces. Axial tension is applied by the pultrusion and, in conjunction with the converging walls of the die, generates sintering pressures to form a composite.

BACKGROUND OF THE INVENTION

The invention is concerned with the production of fiber-reinforced composites, especially composites having a glass or glass-ceramic matrix. It is particularly concerned with forming elongated composite bodies, such as rods, tubes or ribbons, that have a uniform cross-section along one axis.

A fiber-reinforced composite comprises a matrix having reinforcing fibers embedded in and bonded to the matrix. Such composites are of great interest in many applications, since they may provide substantially greater mechanical strength and/or toughness than the matrix alone. Commercial activity thus far has largely involved glass-fiber-reinforced composites having an organic polymer or metal matrix. More recently, however, composites employing glass or glass-ceramic matrices have been receiving attention, particularly for high temperature environments.

LITERATURE

The production of inorganic composites having flexural strengths up to and in excess of 100,000 psi plus excellent toughness, has been reported. These composites employ either silicon carbide or graphite fibers in a matrix of glass or glass-ceramic. The materials, as well as their production by hot pressing, are described, for example, in U.S. Pat. Nos. 4,485,179 (Brennan et al.), 4,511,663 (Taylor), 4,588,699 (Brennan et al.) and 4,589,900 (Brennan et al.).

It has been proposed to employ applied stress to impart polarizing properties to glasses containing, as a second phase, either silver halide particles, or a separated glass phase. Application of stress to such a glass renders the second phase anisotropic. Stress may be applied by rolling, extruding or stretching the glass, the second phase becoming elongated and aligned in the process. Particular reference is made to U.S. Pat. Nos. 3,653,863 (Araujo et al.) 4,282,022 (Lo et al.) and 4,304,584 (Borrelli et al.).

U.S. Pat. No. 4,581,053 (Prewo et al.) describes producing fiber-reinforced glass composites from glass-impregnated, woven-fiber prepregs. A continuous length of fibers is impregnated with a slurry of glass powder, and several such impregnated bundles are woven into a predetermined structural shape, e.g., a belt. The woven fiber network may then be cut into plies which are stacked in desired shape, and hot pressed into a fiber-reinforced, glass-matrix composite. This composite has a substantially uniformly distributed glass matrix, and exhibits multiaxial strength in three mutually exclusive, perpendicular directions.

PURPOSES OF THE INVENTION

The present invention has been developed primarily as a practical means of utilizing inorganic matrix materials, such as glass. However, it is apparent that it may be applied to advantage in processing composites embodying other matrix materials as well.

Companion application Ser. No. 942,281 discloses and claims a method of producing inorganic composites by drawing an impregnated body of fibers through a consolidating die. The present invention provides an alternative method that obviates the need for a consolidating die. This method employs a fiber network of such construction that sintering pressures inherently develop between the fibers as axial tension is applied to the fibers. Otherwise, the purposes of the two methods correspond, and the recital in the companion application is incorporated herein by reference.

STATEMENT OF THE INVENTION

My invention is a method of producing an elongated, fiber-reinforced, composite body, having a uniform cross-section along one axis, which comprises;

impregnating several continuous multifiber lengths with a matrix material;

weaving or twisting lengths of the impregnated fibers into an elongated network wherein fiber lengths cross each other at an angle to the network axis;

bringing the matrix material in the impregnated network to a softened condition;

creating an axial tension along the fiber network axis to further elongate the network and generate a pressure between the crossed fiber lengths to consolidate the mass; and cooling the elongated composite.

In a preferred embodiment, the matrix material may be either a stable glass or one adapted to being thermally converted to a glass-ceramic. Accordingly, while the invention is applicable to matrix materials generally, it is of particular interest for use with glass matrix materials, and is so described.

GENERAL DESCRIPTION

The invention provides a method of producing composites in elongated shapes such as ribbons, rods or tubes. Unitary materials, such as glasses, ceramics, and plastics, are commonly extruded or rolled in elongate form. However, such techniques are not adaptable to formation of elongated composites, particularly where fiber alignment is desired.

Companion application Ser. No. 942,281 describes adaptation of pultrusion to the production of fiber-reinforced composites having a glass or glass-ceramic matrix. In that procedure, as adapted, applied axial tension combines with the effect of converging walls on a die to generate sintering pressures essentially radially.

The method of this application differs in that the die may either be completely omitted, or employed only as a shaping member. Sintering pressures, equivalent to those exerted by the die walls, are intrinsically developed by pressure of one impregnated fiber strand against an adjacent impregnated strand when axial tension is applied to the fiber network.

As an initial step, the fiber strands, or yarns, that make up the network must be impregnated with the matrix material. A molten bath may be used, providing the bath can be maintained at a low viscosity, e.g. not over 10 poises, to satisfactorily penetrate a fiber bundle. This has not appeared practical with existing glass materials. Accordingly, an alternative procedure is employed wherein a fiber tow, strand, or yarn is impregnated with a slurry of pulverized matrix material in a separate step.

In this procedure, a selected matrix glass, for example, is melted and then pulverized. The average particle size is not over about 30 microns, preferably on the order of ten microns or less and the particles are suspended in the form of a slurry. The slurry contains a vehicle (e.g. an alcohol and/or water), a solvent, a dispersant, a viscosity modifier and a binder (e.g. a latex binder). Fiber bundles are passed through the slurry to become impregnated. The impregnated fibers may then be dried and stored as prepregs before further treatment. Alternatively, they may be employed directly for further treatment in accordance with the invention.

The glass matrix may be of any known composition. However, prior composite experience has shown optimum properties achieved with boro- or alumino-silicate glasses. If a glass-ceramic matrix is desired, an appropriate glass will be employed and subsequently crystallized. Normally, the matrix glass will be premelted and pulverized.

The fiber-reinforcing material may be a plurality of fibers in a tow, or strand, or yarn. The fibers may, for example, be graphite or silicon carbide, as known in the reinforcing art. An inert, or reducing, atmosphere may be employed to protect the fibers or matrix if necessary.

The ratio of fibers-to-matrix will depend on the particular circumstances of any given application. Thus, it is contemplated that the elongated composite formed may contain as little as 10% or as much as 80% fibers. A value of 40–50% by volume is currently preferred.

A key feature of the present invention is use of a fiber structure in which a plurality of impregnated strands are knitted or woven into a fabric-like form. The fiber structure may be produced on a conventional knitting machine. The particular apparatus and technique used forms no part of this invention.

The critical requirement is a criss-cross arrangement of two sets of parallel fiber strands such that one set is at a relatively large angle to the center axis of the knitted structure. The angle between the fiber strand and the center axis may vary with different applications. However, a key feature is that the angle is a large value in the preconsolidation network structure that is diminished substantially as a stretching tension is applied.

The other set(s) of fiber strands may cross normal to the first set, that is at a corresponding angle to the axis. Thus, each fiber strand crosses over-and-under successive strands of the other set.

Application of a pulling force along the central axis of the knitted structure causes the structure to elongate in the direction of the axis. This changes the crossing pattern of the strands from a relatively normal pattern, e.g. 90°, to an increasingly smaller angle between the fiber and the central axis, thus creating an elongated, diamond shaped pattern.

My invention is based, in substantial part, on my discovery that, as the matrix is softened, and the network is stretched along a central axis, there is a tendency for the fiber strands to exert great pressure on each other.

Thus, a consolidated body may be formed at much lower temperatures, and higher viscosities, than could be expected. The maximum temperature is not greater than that at which the glass viscosity is 10'' poise. Since the glass never approaches the temperature-viscosity relation normally required for liquid flow, the forces generated are referred to as consolidating or sintering forces.

Before applying axial tension to stretch the knitted-fiber-network, the latter may be passed into a tubular furnace, or other suitable heating chamber having entry and exit openings and zoned heat control. The heating chamber may have means for maintaining a non-oxidizing atmosphere, such as nitrogen, in the chamber.

The knitted structure is gradually heated to soften the glass while an axial tension is applied to the knitted structure. This tends to stretch the structure. More significant, it tends to draw the crossed fibers from a rectangular or normal crossed relation into a diamond-like relation. As a result, the fiber strands tighten and tend to create angular stresses. The result is a consolidated body with the glass tightly compressed within and bonded to the fibers. Finally, the consolidated body may be drawn through a shaping die and then cooled for subsequent use.

THE DRAWINGS

The invention is further disclosed with reference to the accompanying drawings wherein.

Figure 1:
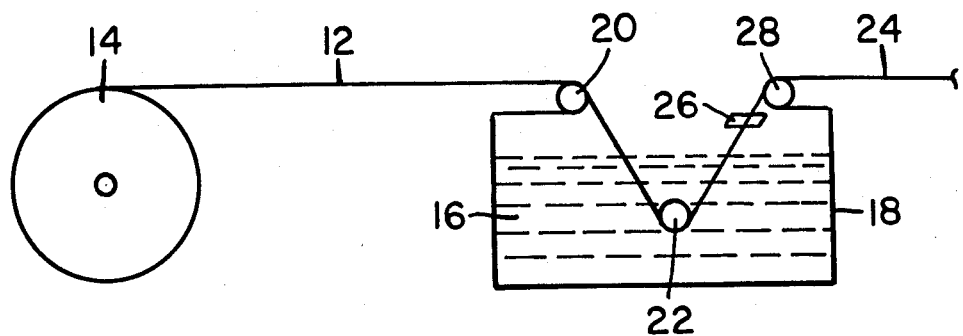
FIG. 1 is a schematic view showing the impregnation of a strand of carbon fibers for use in accordance with the invention.

FIG. 1 illustrates a known procedure for impregnating a bundle of carbon fibers to be used in carrying out the invention. As shown, a strand 12 may be drawn from a supply roll 14 and passed into and through an impregnating slurry 16 in a vessel 18. Strand 12 is passed over roll 20, into slurry 16 and under roll 22 in vessel 18. The impregnated strand 24 is now turned upward to pass out of the slurry and through a die 26 which strips excess slurry from impregnated strand 24. The latter is then pulled over roll 28 to resume a horizontal path.

It will be appreciated that, while impregnation of a single strand is shown for simplicity and clarity, several may be impregnated simultaneously. Each may be dried, collected on a roll and stored for future use. Alternatively, a plurality of impregnated strands 24 may be fed directly to a knitting machine (not shown) to knit the desired fabric form. Strands 24 may be dried if necessary for compatibility with the knitting mechanism.

Figure 2:
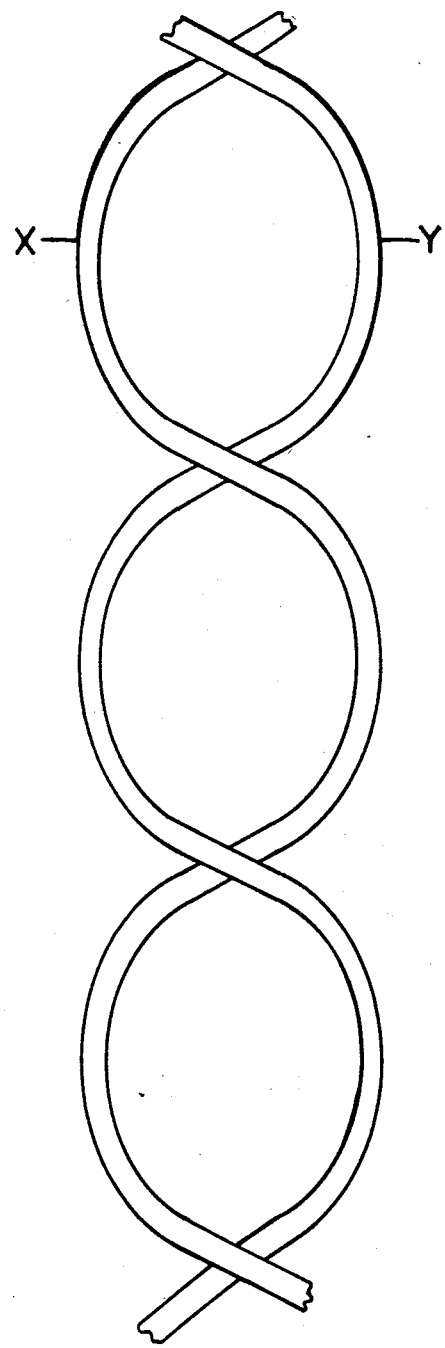
FIG. 2 is an enlarged top view showing portions of two impregnated fiber strands in loose twisted form.

FIG. 2 shows fragmented portions of two impregnated fiber strands, x and y, in twisted form preparatory to use in accordance with the present invention. The Figure illustrates how the impregnated strands initially cross each other at approximately right angles. Further, the over-and-under, alternate crossovers, which characterize the twisted form, lock the fiber strands together. This causes them to tighten against one another when axial tension is applied to the network.

Figure 3:
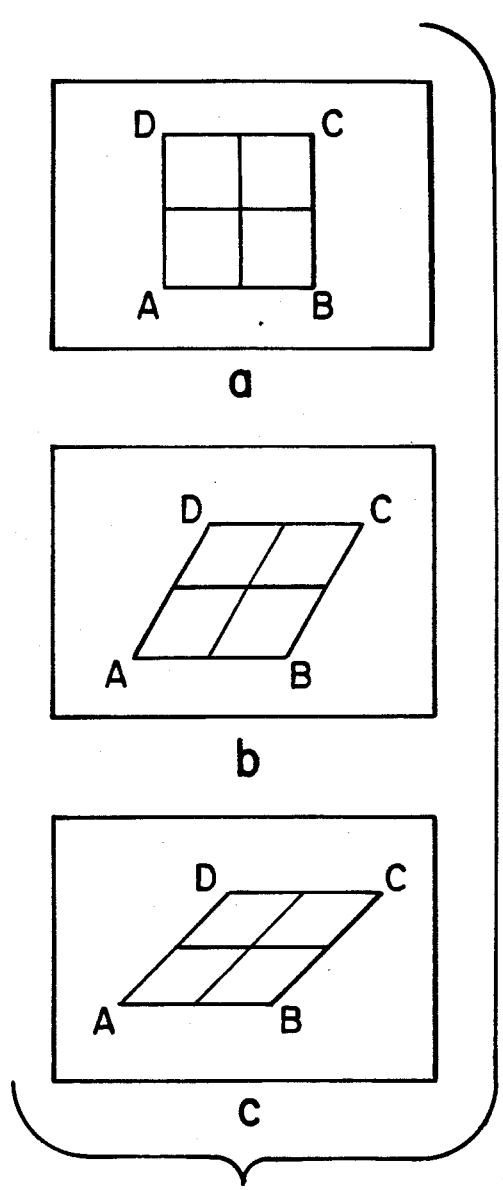
FIGS. 3a, 3b and 3c are vector diagrams illustrating successive changes in a section of the woven strands of FIG. 2 when an axial pulling force is applied.

This is further illustrated in FIGS. 3a, 3b and 3c. FIG. 3a is a generalized illustration of the components in any two-axis system, ABCD. Such a system is similar to a four bar linkage mechanism. By design these systems are inherently unstable and will collapse when any eccentric (shear) load is applied.

Consequently, if a force, for example a stretching force, is applied along axis AC, the system readily elongates along diagonal AC as shown at successive stages in FIGS. 3b and 3c. Also, as illustrated, the system is compressed, or drawn together, along axis BD perpendicular to AC. It is apparent, then, that application of an axial force along axis AC of a fabric results in a compressive force being generated along axis BD.

It will be appreciated that a woven, or knitted, or braided type fabric or structure, embodying a plurality of strands, will be employed in practice. However, for illustration, a basic, two-strand, twisted form was deemed more practical.

In one practical form of application, a biaxially braided length of tubular fabric is formed, on a mandrel of a knitting machine, from impregnated strands. The braided tubing is then arranged for passage into a heating chamber, followed by application of axial pull to the tubular fabric. In this manner, the tubular fabric collapses to a closed structure. The effect of this collapse is to provide a radial compressive force to the fabric structure. This is similar to the compressive, sintering forces generated by the converging die in Ser. No. 942,281 when the blank is pultruded through the die in that process.

Figure 4:
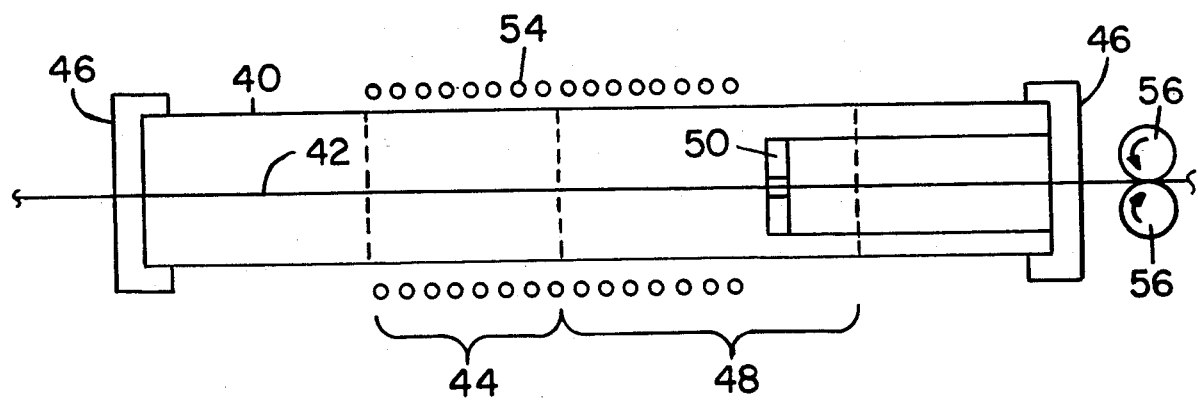
FIG. 4 is a schematic view of a tubular heating chamber in which the invention may be carried out.

FIG. 4 illustrates a tubular furnace 40 in which a woven structure 42 of impregnated strands 24 may be heated to a consolidating temperature. Furnace 40 may be provided with end caps 46 at its entry and exit openings. This permits maintaining a positive pressure of a non-oxidizing gas, such as nitrogen in the furnace.

As woven structure 42 is drawn within furnace 40, it passes through an initial preheat section 44 and a primary heating zone 48. In zone 48, the impregnating glass softens and penetrates the fiber interstices permitting structural collapse of the fiber structure. This forms a densified, sintered, reinforced, glassy body under the influence of forces developed by applied axial tension.

Thermal zones 44 and 48 are heated by elements 54 wherein the amount of heat supplied may be controlled at predetermined levels.

The consolidated body may be drawn through a shaping die 50 to impart a desired cross-section to the elongated composite exiting from furnace 40. Cooling air, or other fluid, may be applied to the exiting composite to render it solid prior to reaching an axial tension source such as pulling rolls 56.

SPECIFIC EXAMPLES

The invention is further described with reference to the following specific applications:

EXAMPLE 1

Eight tows of graphite fibers were impregnated with a slurry of a borosilicate glass having an average particle size not over about ten microns. The tows were dried and braided over a length of ¼ inch plastic tubing to form a tubular fabric.

A 150 inch length of the braided tube was passed into a tube furnace, as illustrated in FIG. 4, and the glass thermally softened. The furnace was operating at a temperature of 950° C. An axial force was applied in a continuous fashion, as by rolls 56. This resulted in collapse of the tube into a consolidated composite. This was drawn through a forming die to provide a 120 inch long bar of ⅛ inch diameter composite.

EXAMPLE 2

As in Example 1, a preform, briaded structure was used. Instead of tubing, a three dimensionally braided member was formed. In this case, the braided member was heated while axial tension was applied by dead weight pull. The fabric collapsed to form a rectangular rod. The structure collapsed by a factor of 5 or more in cross-sectional area to provide a rigid structural bar ¼"×⅛".

I claim:

1. A method of producing an elongated fiber-reinforced, composite body having a uniform cross-section along one axis which comprises:
    impregnating several continuous, multifiber lengths with a glass or glass-ceramic matrix material having a softening temperature below the temperature at which the fibers undergo thermal destabilization;
    weaving or twisting lengths of the impregnated fibers in an elongated network wherein fiber lengths cross each other at a relatively large angle to the center axis of the impregnated fiber network;
    bringing the glass or glass-ceramic matrix material in the impregnated fiber network to a softened condition;
    creating an axial tension through an axial tension source along the center axis of the impregnated fiber network to cause the impregnated fiber network to elongate in the direction of the axis, whereby the angle of the fiber lengths to the center axis of the impregnated fiber network is decreased, and to generate a pressure between the crossed fiber lengths to consolidate the impregnated fiber network into a solid composite;
    cooling the elongated composite.

2. A method according to claim 1 wherein heat is applied to the impregnated network to soften the glass or glass-ceramic matrix.

3. A method according to claim 1 wherein the multifiber lengths are impregnated with a slurry of finely divided glass or glass-ceramic.

4. A method according to claim 3 wherein the average particle size of the glass or glass-ceramic is not over about 30 microns.

5. A method according to claim 1 wherein the reinforcing fibers are carbon or silicon carbide fibers.

6. A method according to claim 1 wherein the network is woven in a tubular form.

7. A method according to claim 2 wherein heat is applied to the impregnated fiber network to raise the temperature thereof to a maximum temperature which is not greater than that at which the viscosity of the matrix material is $10^{11}$ poise.

8. A method according to claim 2 wherein the impregnated network is heated to consolidating temperature in a closed chamber.

9. A method according to claim 8 wherein the network is heated in an inert or reducing atmosphere.

10. A method according to claim 1 wherein the consolidating network is drawn through a shaping die and then cooled.

11. A method according to claim 1 wherein said axial tension is applied along the center axis of the impregnated fiber network and the consolidated impregnated fiber network is solidified before reaching the source of the axial tension.

12. A method according to claim 2 wherein the matrix is a crystallizable glass and the consolidated composite is heated to convert the glass matrix to a glass ceramic.

* * * * *